(12) United States Patent
Claveria Canal et al.

(10) Patent No.: US 9,074,584 B2
(45) Date of Patent: Jul. 7, 2015

(54) ELECTROSTATIC CHARGE DE-IONIZING LIGHTNING ROD FOR PROTECTION OF WIND TURBINE GENERATOR BLADES AND WIND TURBINE GENERATOR WITH BLADES PROVIDE WITH ELECTROSTATIC CHARGE DE-IONIZING LIGHTNING ROD

(76) Inventors: Antonio Claveria Canal, La Massana (AD); Angel Rodriguez Montes, Ordino (AD); Diego Haro Cervantes, La Massana (AD); Marguerite Coll, Encamp (AD)

( * ) Notice: Subject to any disclaimer, the term of this patent is extended or adjusted under 35 U.S.C. 154(b) by 657 days.

(21) Appl. No.: 13/438,163

(22) Filed: Apr. 3, 2012

(65) Prior Publication Data

US 2012/0257972 A1    Oct. 11, 2012

(30) Foreign Application Priority Data

Apr. 8, 2011   (ES) .................................. 201130559

(51) Int. Cl.
*F03D 1/02*         (2006.01)
*F03D 11/00*        (2006.01)

(52) U.S. Cl.
CPC .......... *F03D 11/0033* (2013.01); *Y02E 10/722* (2013.01)

(58) Field of Classification Search
USPC .................... 415/4.1, 4.3; 416/61; 290/44, 55
See application file for complete search history.

(56) References Cited

U.S. PATENT DOCUMENTS

| | | | |
|---|---|---|---|
| 4,540,844 A * | 9/1985 | Sautereau et al. ................. | 174/3 |
| 4,565,900 A * | 1/1986 | Arnau ................. | 174/3 |
| 6,307,149 B1 * | 10/2001 | Zini et al. ........... | 174/3 |
| 6,864,416 B2 | 3/2005 | Montes et al. | |
| 2004/0140121 A1 * | 7/2004 | Rodriguez Montes et al. ......... | 174/137 R |
| 2006/0051207 A1 * | 3/2006 | Becerra et al. ..................... | 416/5 |
| 2009/0053062 A1 * | 2/2009 | Arinaga et al. ........... | 416/146 R |
| 2010/0006312 A1 * | 1/2010 | Rizk et al. ........... | 174/2 |
| 2010/0158688 A1 * | 6/2010 | Benito et al. ................... | 416/39 |

FOREIGN PATENT DOCUMENTS

ES        2 216 691        10/2004

* cited by examiner

*Primary Examiner* — Edward Look
*Assistant Examiner* — Aaron R Eastman
(74) *Attorney, Agent, or Firm* — Michael J. Striker

(57) ABSTRACT

A lightning rod for blades of a wind turbine generator is attached to a corresponding blade, includes an exterior electrode of electric conductive material and mechanically resistant, preferably aluminum, separated by one or several isolating disks from an interior electrode, is connected through a mechanical or electric connector and the appropriate electric conductor to a conductor of the ground circuit, and is equipped with an LED battery and a probe for vibration control at the blade.

20 Claims, 1 Drawing Sheet

ELECTROSTATIC CHARGE DE-IONIZING LIGHTNING ROD FOR PROTECTION OF WIND TURBINE GENERATOR BLADES AND WIND TURBINE GENERATOR WITH BLADES PROVIDE WITH ELECTROSTATIC CHARGE DE-IONIZING LIGHTNING ROD

CROSS-REFERENCE TO RELATED APPLICATION

The invention described and claimed hereinbelow is also described in Spanish Patent Application ES 201130559 filed on Apr. 8, 2011. This Spanish Patent Application, whose subject matter is incorporated here by reference, provides the basis for a claim of priority of invention under 35 U.S.C. 119(a)-(d).

BACKGROUND OF THE INVENTION

The object of the present invention is an electrostatic charge de-ionizing lightning rod aimed at optimizing the protection of wind turbines against lightning action, specifically designed to reduce direct lightning impact over the blades of wind turbine generators.

The object of the present invention is also to provide a wind turbine generator with blades having the electrostatic charge de-ionizing lightning rods of the invention.

The present invention is related to on Spanish patent ES 200202884 in regard to protection against lightning action.

There are several protection systems against lightning action, mainly located on the extremes of the wind generator blades, generally based on air excitation thanks to the power of the tips within a natural electric field, during a storm, to capture lightning, in order to divert it or lead it to a ground circuit.

These systems are unable to guarantee a complete protection to people or facilities as they are unable to control the polarity of lightning or to determine the intensity of the energy that will develop during the operation of the tip lightning rod.

When lightning impacts the tip of the lightning rod, there will be, depending on its polarity, electro-dynamic, thermal, electrical, magnetic and electro-magnetic effects. If lightning polarity is positive, an ascending light trajectory in the direction of the cloud will be physically observed, lightning will come from the wind turbine generator's blade towards the cloud to discharge in it.

In this case, the effort and work executed by this meteorological phenomenon (positive lightning) causes the destruction of material and, to a lesser extent, of electric equipment, since as lightning energy passes through in a fraction of a second it generates a thermodynamic work effort accompanied by instantaneous thermal effects, which transform in the segregation of part of the tip of the blade, causing a fire risk.

The blade then usually loses its aerodynamic properties; it starts vibrating and it eventually gets disengaged from its housing and is expelled, in some cases over a hundred meters away. When the blade is disengaged, the wind turbine generator becomes de-stabilized losing its vertical center of gravity, causing a sudden increase in pressure on the opposite end that can fold and laterally demolish the entire wind generator, all that taking into account of the weight (almost 8000 kg.) and dimensions (an average of around 36 meters) of each of the blades of a wind turbine self-generator.

In case of a negative impact of lightning over the blade, its trajectory will be descending from the cloud to the point of contact with the blade. The effects shown on the blade due to the impact of lightning will be direct and indirect, starting at the tip and ending on the ground circuit that will evaporate its water with loss of the mineral and crystallization of the earth compounds.

As lightning advances over the equipment, its intensity will affect the materials of which the blade is composed. In the point of lightning impact on the blade, an instant direct fusion occurs with loss of material and risk of fire. During this same instant, the current that appears has the high-frequency behaviour that generates, as it passes for an instant, the molecular modification of materials. This effect of the electricity generates the creation of a high intensity electric field that polarizes all material instantly as it passes through. The different electromagnetic phenomenons cause the crystallization of the simplest materials, such as carbon fiber.

These effects generate, in the short term, a loss of mechanical resistance of the materials where the lightning current flows, resulting in an instant change of its physical characteristics, losing their flexibility and the mechanical resistance for which they were designed. The lightning current follows its path, seconds later, through the lower electrical resistance conductors, generating high temperatures and electric arcs, if correct bonding between conductive and semi-conductive materials, such as resin, copper plate, conductive tape, mechanical structure and electric components is not present.

As lightning current advances through the blade, it passes directly to the compartment area of the generator through the conductors or the spark gaps. If the discharge is of great intensity it does not flow through curved conductors, jumping as a spark in a straight line, from the blade's electric conductor towards the rotor's axis, passing the current to the self-generator itself.

The electromagnetic effects due to the lightning impact and the current originate, as they pass through, couplings and inductions on the navigation electronics, which are in charge of the orientation of the self-generator based on the direction of the wind, losing temporary or permanent information, likewise directly affecting the electronic part that regulates braking, which could, after this moment, dangerously increase the generator's speed due to storm winds, reaching the overheating limits of the rotor's bearings as the blade's revolutions increase to their maximum limits.

This overheating can cause a fire of the oil in the aforementioned bearings, at which moment the generator enters a phase referred to as of "sacrifice" due to the velocity of these occurrences and the lack of necessary time for the disconnection of the generator from the grid, making it impossible to use water for the extinction as voltage is present on the set.

Once the fire has initiated in the generator compartment, it extends to the blades, which will detach in pieces, with the generator becoming destroyed, in a vertical or folded position, depending on the circumstances, finally generating losses in production and repair, with very high cost.

As conclusion for this description of the effects of lightning impact and the current protective techniques, it should be stated that the different protective systems placed on the blades have a pointed end and do not provide an effective protection. Currently there are no protection systems that eliminate or limit the possibility of lightning impact on the blade, said systems being conceived for the capture of the lightning through excitation, channeling the lightning to the ground through tips.

SUMMARY OF THE INVENTION

It is therefore an object of the present invention to provide an electrostatic charge de-ionizing rod for protection of wind turbine generator blades, which is an improvement of the existing protection element of this type.

In keeping with these objects and with others which shall become apparent hereinafter, one feature of the present invention resides, briefly stated, in an electrostatic charge de-ionizing rod for protection of wind turbine generator blades including an exterior electrode; an interior electrode; at least one isolating disc separating said exterior electrode from said interior electrode; and means for connecting said exterior electrode, said at least one isolating disc, and said interior electrode to a tip of a blade of the wind turbine generator.

The de-ionizing lightning rod of the present invention is totally adapted to the protection needs of the wind turbine generator blades in order to reduce or eliminate the possibilities of direct impact of the structure to be protected. The operation principle of this application is based on the constant control of the electric field at the tip of the blade to avoid ionization of the air.

Its materials characteristics as well as shapes enable the transformation of charges of any polarity into small currents that leak down to the ground through electric conductors.

This novel protection system needs a low-resistance ground circuit, both on the ground where the circuit is housed as well as at the tip of the blade, where the system object of this invention is placed. It innovatively incorporates an "LED" battery for the signalling of this tip point of the blade, as well as an electronic device that controls the blade vibration levels while in movement. Both devices are connected through electric conductors to the illumination control box and the vibration controls.

The constant dissipation of electrostatic charge of the de-ionizing lighting rod, a basic characteristic of this kind of lightning rods as described on the aforementioned Spanish patent (ES 200202884), eliminates the possibility of exciting lightning at the tip, this way protecting the entire generator structure. The electric continuity of the whole route of conduction of the lightning energy is also guaranteed, from the lightning rod located at the tip of the blade to the ground circuit, avoiding pronounced curves, with radii under 20 cm. This conductive cable will have a minimum section equal or more than 35 mm2, over its entire route.

The present invention also embraces a wind turbine generator with blades provided with the inventive electrostatic charge de-ionizing rod.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
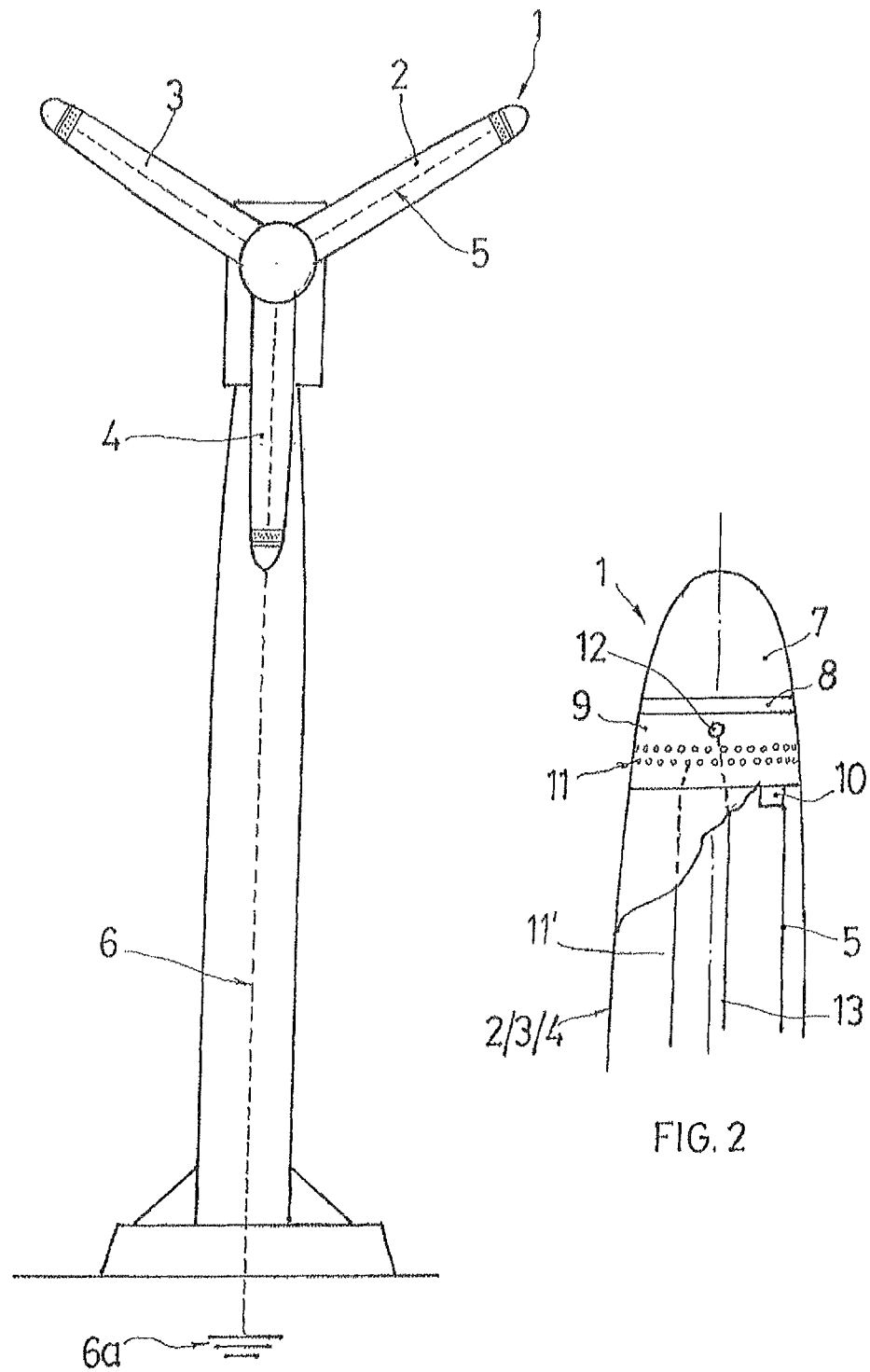
FIG. 1 is an overall view of a wind turbine generator with three blades, each equipped with a lightning rod of the invention, showing a central body where an alternator-generator group is housed, a central support, a ground circuit, and conducting cables that connect each lightning rod to the ground circuit, and, FIG. 2 is a view on a greater scale and partially sectioned of one of the blade tips, where the de-ionizing lightning rod of the invention is accommodated.

An electrostatic charge-ionizing lightning rod is identified as a whole with reference numeral 1. The de-ionizing lightning rod (1) is located on the tip of each of the blades (2, 3 and 4). With this location of the de-ionizing lightning rods (1), when the blades of the wind turbine are rotated, the lightning rods remain in the most salient area of a radius of rotation, or in other words of the radius of rotation of the blades (2, 3 and 4).

Each of the lightning rods (1) is connected through a corresponding conductor (5) to a conductor (6) or a ground circuit (6a) or to a grid of the ground circuit of a wind farm.

As shown in FIG. 2, the de-ionizing lighting rod (1) includes an exterior electrode (7), an isolating disc (8), and an interior electrode (9). A plurality of the isolating discs (8) can be located between the exterior electrode (7) and the interior electrode (9). The de-ionizing lightning rod (1) composed of the exterior electrode (7), the isolating disc/discs (8), and the interior electrode (9) can be connected to the tip of each of the blades (2, 3 and 4).

The specific functions of the exterior electrode (7), the isolating disc/discs (8), and the interior electrode (9), are disclosed in detail in the Spanish patent ES 200202884 which has been referred to hereinabove.

The exterior electrode (7) of the de-ionizing lightning rod (1) is floating relative to a ground potential, while the interior electrode (9) is connected to the ground through a mechanical or electrical connectors (10). The connectors (10) are connected through conductors (5) to the conductors (6) of the ground circuit (6a) or to the earth grid of the wind farm.

An LED battery (11) is located on the interior electrode (9). It is powered electrically by a conductor (11') and operates for light signaling. A probe (12) is provided for vibration control of the blade and connected through a sensor cable (13).

The lightning rod (1) has an external shape which is adaptable to any shape or geometry, depending on the type and characteristic of the blade, on which it is to be installed.

According to the drawings, the electrostatic charge de-ionizing lightning rod (1) is located on the tip of the blade, three on the graphic representation, references (2, 3 and 4). This location allows that, when the blades are rotating the lightning rods (1) they will remain in the most salient area of radius of rotation, or rotation of said blades (2, 3 and 4).

Each of these lightning rods (1) are connected through a corresponding conductor (5) to another conductor (6) of the ground circuit (6a) or to the grid of the ground circuit of the wind farm.

The de-ionizing lightning rod (1), as shown in FIG. 2, is formed by the following components: an exterior electrode (7), an isolating disk (8), and an interior electrode (9), where the connection system of the lightning rod set on the tip of the corresponding blade (2, 3 and 4) is found.

The specific function of these components is explained in detail in Spanish patent ES 200202884 which has been referred to from the beginning of the description.

In this embodiment, the exterior electrode (7), is floating in relation to the ground potential, while the interior electrode (9) is connected to the ground through mechanical or electrical connectors (10), which are connected through conductors (5) to conductor (6) of the ground circuit (6a) or also to the earth grid of the wind farm.

At the same time, an "LED" battery (11) is located on the interior electrode (9). powered electrically by a conductor (11') as a means for light signalling, and a probe (12) for vibration control of the blade, connected through a sensor cable (13).

The external shape of the lightning rod (1) will adapt to any shape or geometry depending on the type and characteristics of the blade where it is to be installed.

The exterior electrode (7) is composed of an electrically conductive material and is mechanically resistant. Preferably, it can be composed of aluminum.

Being the object of the present invention sufficiently described, it must be noted that the shape, dimensions, exterior aspect, as well as materials used in the practical embodiment of the de-ionizing lightning rod are non-limiting and will not alter the essentiality of the invention, which is summarized in the following claims.

It will be understood that each of the elements described above, or two or more together, may also find a useful application in other types of constructions differing from the types described above.

While the invention has been illustrated and described as embodied in an electrostatic charge de-ionizing lightning rod for protection of wind turbine generator blades and wind turbine generator with blades provide with electrostatic charge deionizing lightning rod, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrostatic charge de-ionizing lightning rod for protection of wind turbine generator blades by reducing a direct impact of lighting on the blades, comprising
    an exterior electrode;
    an interior electrode;
    at least one isolating disc separating said exterior electrode from said interior electrode; and
    means for physically and electrically connecting said interior electrode to a tip of a blade of the wind turbine generator such that said at least one isolating disc, while physically connecting the exterior electrode to the interior electrode and, thereby, the rod to the tip of the blade, maintains electrical isolation between said exterior electrode and said interior electrode.

2. An electrostatic charge de-ionizing lightning rod as defined in claim 1, wherein said connecting means include a connector selected from the group consisting of a mechanical connector and an electrical connector.

3. An electrostatic charge de-ionizing lightning rod as defined in claim 2, further comprising a conductor connecting said connector to a ground circuit.

4. An electrostatic charge de-ionizing lightning rod as defined in claim 2, further comprising a conductor connecting said connector to an earth grid.

5. An electrostatic charge de-ionizing lightning rod as defined in claim 1, wherein said exterior electrode and said interior electrode are configured to constantly control an electric field of a tip area of the blade to reduce an electric field through de-ionization, transforming charges of any polarity into small currents that leak down to a ground through an electrical conductor.

6. An electrostatic charge de-ionizing lightning rod as defined in claim 1, further comprising a system selected from the group consisting of a signaling system and a marking system.

7. An electrostatic charge de-ionizing lightning rod as defined in claim 6, wherein said system includes an LED battery powered by a conductor.

8. An electrostatic charge de-ionizing lightning rod as defined in claim 6, wherein said system includes a probe with a cable sensor for vibration control at the blade.

9. An electrostatic charge de-ionizing lightning rod as defined in claim 6, wherein said system includes an LED battery powered by a conductor, and a probe having a cable sensor for vibration control at the blade.

10. An electrostatic charge de-ionizing lightning rod as defined in claim 1, wherein said exterior electrode is composed of an electrically conductive material.

11. An electrostatic charge de-ionizing lightning rod as defined in claim 10, wherein said exterior electrode is composed of aluminum.

12. A wind turbine generator, comprising
    a plurality of blades; and
    an electrostatic charge de-ionizing lightning rod provided on each of said blades for protection of the blades by reducing a direct impact of lighting on the blades;
    wherein said electrostatic charge de-ionizing lightning rod comprises:
        an exterior electrode;
        an interior electrode;
        at least one isolating disc separating said exterior electrode from said interior electrode; and
        means for physically and electrically connecting said interior electrode to a tip of a blade of the wind turbine generator such that said at least one isolating disc, while physically connecting the exterior electrode to the interior electrode and, thereby, the rod to the tip of the blade, maintains electrical isolation between said exterior electrode and said interior electrode.

13. A wind turbine generator as defined in claim 12, wherein said connecting means include a connector selected from the group consisting of a mechanical connector and an electrical connector.

14. A wind turbine generator as defined in claim 12, further comprising a conductor connecting said connector to a ground circuit.

15. A wind turbine generator as defined in claim 12, further comprising a conductor connecting said connector to an earth grid.

16. A wind turbine generator as defined in claim 12, wherein said exterior electrode and said interior electrode are configured to constantly control an electric field of a tip area of the blade to reduce an electric field through de-ionization, transforming charges of any polarity into small currents that leak down to a ground through an electrical conductor.

17. A wind turbine generator as defined in claim 12, further comprising a system selected from the group consisting of a signaling system and a marking system provided in the lightning rod.

18. A wind turbine generator as defined in claim 17, wherein said system includes an LED battery powered by a conductor.

19. A wind turbine generator as defined in claim 17, wherein said system includes a probe with a cable sensor for vibration control at the blade.

20. A wind turbine generator as defined in claim 17, wherein said system includes an LED battery powered by a conductor, and a probe having a cable sensor for vibration control at the blade.

* * * * *